United States Patent Office 2,834,650
Patented May 13, 1958

2,834,650
PRODUCTION OF BORON NITRIDE

Louis A. Conant, Indianapolis, Ind., and Evart F. Hittle, Kenmore, N. Y., assignors to Union Carbide Corporation, a corporation of New York No Drawing. Application October 4, 1955
Serial No. 538,531

7 Claims. (Cl. 23—191)

This invention relates to the production of boron nitride.

Boron nitride is a material which has been known for many years and which has extremely interesting chemical properties and physical characteristics. Its possible uses are many, but it remains a rather rare material because of difficulties encountered in its production. Although the reactions involved which have been explored in the past are relatively simple, yields are low and the product produced is quite impure. Some of the proposed processes for the manufacture of boron nitride require the use of cyanides which are of course extremely hazardous and such processes are not looked upon with favor by industry.

It is the principal object of this invention to provide an improved process for the production of boron nitride which produces a good yield of reasonably pure product and avoids the use of dangerous reactants.

This object is achieved by the invention which comprises a method of producing boron nitride by reacting metaboric acid or boric oxide with calcium cyanamide at elevated temperature in a protective atmosphere containing a substantial proportion of nitrogen. The desired reaction takes place in the range 1200° C. to 2000° C., a suitable operating temperature being about 1400° C.–1700° C. The protective atmosphere preferably should be richer in nitrogen than about 50% by volume, for with lower nitrogen contents the reaction will proceed too slowly, and may be substantially pure nitrogen or ammonia. An annealing gas containing about 93% nitrogen and 7% hydrogen has been found to be satisfactory.

In practicing the invention the solid reactants are crushed and thoroughly mixed. They are placed in a suitable vessel such as, for instance, a furnace having a controllable atmosphere and heated to the reaction temperature. It is believed that the calcium cyanamide releases nitrogen in the interior of the charge and thereby effects reaction throughout the charge, the protective atmosphere also serving to provide nitrogen to the charge.

The principles of the invention are illustrated by the following specific examples of its practice for the production of boron nitride.

A series of six runs was made in which metaboric acid and calcium cyanamide were utilized in differing proportions. Each batch was heated in the range 1400° C.–1750° C. in a carbon tube through which was passed a gas containing 93% nitrogen and 7% hydrogen at the rate of 20 cubic feet per hour. In Table I below are set forth the compositions of the charges, the temperature of reaction and the time of reaction together with the yield of boron nitride. It will be observed that in each of the runs a substantial yield of boron nitride was produced, the greatest being produced when the charge contained equal parts of the reactants and was heated at 1600° C.

TABLE I

| Run No. | Charge, Percent $HBO_2$ | Composition, Percent $CaCN_2$ | Temp., °C. | Time, Hrs. | Percent Yield BN |
|---|---|---|---|---|---|
| 1 | 50 | 50 | 1,400 | ½ | 71 |
| 2 | 50 | 50 | 1,600 | 1 | 82 |
| 3 | 52.3 | 47.7 | 1,700 | 1 | 67 |
| 4 | 62.7 | 37.3 | 1,800 | | 59 |
| 5 | 62.7 | 37.3 | 1,700 | 4 | 57 |
| 6 | 62.7 | 37.3 | 1,750 | 2 | 65 |

The product produced in the experiments just described was washed with dilute hydrochloric acid, then heated in air at about 1000° C. for about 15 minutes to burn out any free carbon occurring as a result of contamination of the tube or derived from the calcium cyanamide. After oxidation the powder was leached with water and dried. An analysis of the product from run 2 and of a mixture of the products of runs 3 and 5 is set forth in Table II together with the theoretical composition of boron nitride.

It will be seen from Table II that some silicon is present in the product. This is traceable to the calcium cyanamide used and may be avoided if desired by the use of a purer grade of reactant.

TABLE II
Chemical analysis

| Run No. | Composition, Percentage by Wt. | | | | | Total | Ratio, N/B |
|---|---|---|---|---|---|---|---|
| | N | B | $H_2O$ | Si | C | | |
| Theory | 56.4 | 43.6 | | | | 100 | 1.29 |
| 2 | 55.4 | 41.6 | 1.00 | 1.50 | .57 | 100.07 | 1.33 |
| 3+5 | 53.7 | 41.8 | 1.10 | 1.30 | .06 | 97.96 | 1.28 |

It is entirely possible and within the scope of the invention to form calcium cyanamide in situ in a reaction bed of the boron compound and a calcium compound. For example, calcium carbide may be used in admixture with boric oxide. At the temperature of reaction (1400° C. to 1750° C.) in a nitrogenous atmosphere calcium cyanamide is formed which in turn reacts with the boron compound as already indicated. Actual test runs have shown that yields of 80% of theoretical or better may be obtained using calcium carbide as starting material. Similarly, oxygen-containing boron compounds which upon heating produce metaboric acid or boric oxide may be employed as starting materials. Where a series of reactions is required as in this procedure, the yield is improved by maintaining the reaction mixture in shallow layers.

It will be seen from the above discussion that the process of the invention produces a good yield of substantially pure boron nitride utilizing reactants readily available and not dangerous. Accordingly, the process makes possible the economical production of boron nitride.

We claim:

1. A process for producing boron nitride which comprises reacting a compound selected from the group consisting of metaboric acid and boric oxide with calcium cyanamide at a temperature in the range 1200° C. to 2000° C. in a non-oxidizing, nitrogenous atmosphere.

2. A process for producing boron nitride which comprises reacting a compound selected from the group consisting of metaboric acid and boric oxide with calcium cyanamide at a temperature in the range 1200° C. to 2000° C. in an atmosphere of substantially pure nitrogen.

3. A process for producing boron nitride which comprises reacting a compound selected from the group consisting of metaboric acid and boric oxide with calcium cyanamide at a temperature in the range 1200° C. to 2000° C. in an atmosphere of ammonia.

4. A process for producing boron nitride which comprises reacting metaboric acid with calcium cyanamide at a temperature in the range 1200° C. to 2000° C. in an atmosphere of substantially pure nitrogen.

5. A process for producing boron nitride which comprises reacting metaboric acid with calcium cyanamide at a temperature in the range 1200° C. to 2000° C. in an atmosphere of ammonia.

6. A process for producing boron nitride which comprises reacting boric oxide with calcium cyanamide at a temperature in the range 1400° C. to 1700° C. in a non-oxidizing atmosphere containing more than 50% nitrogen.

7. A process for producing boron nitride which comprises reacting boric oxide and calcium carbide in a nitrogenous, non-oxidizing atmosphere at a temperature in the range 1400° C. to 1750° C., thereby forming calcium cyanamide, and continuing reaction in said temperature range and in said atmosphere between the calcium cyanamide so formed and boric oxide, thereby producing boron nitride.

References Cited in the file of this patent

FOREIGN PATENTS

| | | |
|---|---|---|
| 647/26 | Australia | Feb. 19, 1926 |
| 245,762 | Great Britain | Oct. 28, 1926 |
| 711,254 | Great Britain | June 30, 1954 |

OTHER REFERENCES

W. Kroll, Z. Anorg. Chem. 102, 17 (1918).